(12) United States Patent
Bishop et al.

(10) Patent No.: US 7,493,326 B2
(45) Date of Patent: Feb. 17, 2009

(54) BSM PROBLEM ANALYSIS METHOD

(75) Inventors: Ellis E. Bishop, Austin, TX (US);
Randy S. Johnson, O'Fallon, MO (US);
Tedrick N. Northway, Wood River, IL (US); Norman J. Peterson, Austin, TX (US); Paul D. Peterson, Round Rock, TX (US); H. William Rinckel, Prospect, CT (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/189,913

(22) Filed: Jul. 26, 2005

(65) Prior Publication Data

US 2007/0027731 A1  Feb. 1, 2007

(51) Int. Cl.
*G06F 17/30* (2006.01)
(52) U.S. Cl. ............... 707/10; 707/102; 707/202; 717/174; 715/221
(58) Field of Classification Search ............ 707/104.1, 707/10, 102, 202; 705/4; 715/200, 221–226; 717/100, 174
See application file for complete search history.

(56) References Cited

U.S. PATENT DOCUMENTS

| | | | |
|---|---|---|---|
| 6,636,585 B2 | 10/2003 | Salzberg et al. | 379/22 |
| 6,678,355 B2 | 1/2004 | Eringis et al. | 379/22 |
| 6,850,866 B2 | 2/2005 | Couchot et al. | 702/182 |
| 7,062,472 B2* | 6/2006 | Dan et al. | 705/80 |
| 2001/0044734 A1* | 11/2001 | Walker et al. | 705/4 |
| 2002/0082882 A1 | 6/2002 | Perry et al. | 705/7 |
| 2002/0173934 A1 | 11/2002 | Potenza | 702/182 |
| 2002/0194047 A1* | 12/2002 | Edinger et al. | 705/9 |
| 2003/0144930 A1* | 7/2003 | Kulkami et al. | 705/31 |
| 2004/0260602 A1 | 12/2004 | Nakaminami | 705/11 |
| 2006/0230389 A1* | 10/2006 | Moulckers et al. | 717/127 |

* cited by examiner

*Primary Examiner*—Cheryl Lewis
(74) *Attorney, Agent, or Firm*—Duke W. Yee; Libby Z. Handelsman; Rudolf O. Siegesmund

(57) ABSTRACT

A method for analyzing a problem in a distributed processing business system used to provide a service is disclosed. The method comprises identifying the problem; preparing for an audit; performing the audit; reviewing the audit; developing an action plan; developing an execution plan; deploying a solution in accordance with the execution plan; monitoring the deployed solution; and recording lessons learned. Alternatively, the method may be applied to evaluate the capacity of a distributed processing business system to provide a prospective service. In this alternative embodiment, the method comprises identifying the problem; preparing for an audit; performing the audit; reviewing the audit; preparing a rating table; populating the rating table with results from the audit; calculating a service rating based upon the results entered in the rating table; and presenting the service rating to management.

1 Claim, 37 Drawing Sheets

*FIG. 4A* 400

| ENGAGEMENT | TRANSITION/ TRANSFORMATION | STEADY STATE DELIVERY | SERVICE CATEGORY NAME |
|---|---|---|---|
| | | | PROJECT/ACCOUNT OFFICE DEFINED INPUTS FROM THE OWNERS OF EACH OF THE SERVICES/PROCESSES DEPLOYED |
| | | | PROJECT/ACCOUNT OFFICE - SECTION A |
| | | | MARKETING/CUSTOMER EXPECTATIONS |
| | | | CUSTOMER EXPECTATIONS UNREALISTIC |
| | | | UNCLEAR OR INCOMPLETE SOLUTION DESCRIPTION |
| | | | PROVIDER'S ROLES, RESPONSIBILITIES OR SERVICES WERE NOT CLEARLY DOCUMENTED |
| | | | SOLUTION MARKETED WAS DIFFERENT FROM THE SOLUTION BEING DELIVERED |
| | | | USER REQUIREMENTS UNCLEAR OR NOT DOCUMENTED |
| | | | UNCLEAR OR INCOMPLETE SOW |
| | | | UNCLEAR OR INCOMPLETE CUSTOMER RESPONSIBILITIES |
| | | | CUSTOMER NOT READY FOR CONTRACT EXECUTION |
| | | | CUSTOMER COMMUNICATIONS |
| | | | CUSTOMER RELATIONSHIP MANAGEMENT |
| | | | PROJECT OFFICE/ACCOUNT - ADD OTHER CONSIDERATIONS |
| | | | |
| | | | COMMENT: FULLY DETERMINE CUSTOMER ENVIRONMENT FROM ENGAGEMENT THROUGH THE CONTRACT EXECUTION. DID THE SALES TEAM UNDERSTAND THE PROBLEM? DID THEY OVERSELL? DID THEY FAIL TO PROPERLY UNDERSTAND THE CUSTOMER ENVIRONMENT AND THE CUSTOMER BUSINESS PROBLEM? WAS THERE A PROBLEM WITH THE CONTRACT SCOPE |
| | | | |
| | | | |
| | | | |
| | | | TOTALS FOR THIS SECTION |

*FIG. 4B*

| ENGAGEMENT | TRANSITION/ TRANSFORMATION | STEADY STATE DELIVERY | SERVICE CATEGORY NAME |
|---|---|---|---|
| | | | PROJECT/ACCOUNT OFFICE DEFINED. INPUTS FROM THE OWNERS OF EACH OF THE SERVICES/PROCESSES DEPLOYED |
| | | | PROJECT/ACCOUNT OFFICE - SECTION B |
| | | | PLANNING |
| | | | INADEQUATE RISK MANAGEMENT PLAN |
| | | | INADEQUATE PROJECT PLAN |
| | | | INADEQUATE TRANSITION PLAN |
| | | | UNREALISTIC SCHEDULE |
| | | | LACK OF ADEQUATE PHASES |
| | | | PROJECT OFFICE/ACCOUNT - ADD OTHER CONSIDERATIONS |
| | | | WAS A QA REVIEW PERFORMED? |
| | | | DETERMINE DELTA BETWEEN THE STEADY STATE PROCESS AND THE BID MODEL TO EVALUATE THE OVERALL BUSINESS IMPACT AND ACCOUNT PROFITABILITY |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

FIG. 4C

| ENGAGEMENT | TRANSITION/ TRANSFORMATION | STEADY STATE DELIVERY | SERVICE CATEGORY NAME |
|---|---|---|---|
| | | | PROJECT/ACCOUNT OFFICE DEFINED. INPUTS FROM THE OWNERS OF EACH OF THE SERVICES/PROCESSES DEPLOYED |
| | | | PROJECT/ACCOUNT OFFICE - SECTION C |
| | | | CUSTOMER ENVIRONMENT |
| | | | INADEQUATE DUE DILIGENCE EFFORTS |
| | | | FAILURE TO UNDERSTAND CUSTOMER TECHNICAL ENVIRONMENT |
| | | | FAILURE TO UNDERSTAND CUSTOMER BUSINESS ENVIRONMENT |
| | | | FAILURE TO UNDERSTAND CUSTOMER POLITICAL AND OPERATIONAL ENVIRONMENT |
| | | | INADEQUATE CUSTOMER TECHNICAL SUPPORT OR COOPERATION |
| | | | PROJECT OFFICE/ACCOUNT - ADD OTHER CONSIDERATIONS |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

FIG. 4D

| ENGAGEMENT | TRANSITION/ TRANSFORMATION | STEADY STATE DELIVERY | SERVICE CATEGORY NAME |
|---|---|---|---|
| | | | PROJECT/ACCOUNT OFFICE - SECTION D |
| | | | STAFFING/ESTIMATING |
| | | | INADEQUATE LABOR ESTIMATES |
| | | | PRODUCTIVITY OVERESTIMATED |
| | | | INCORRECT ASSUMPTION REGARDING PRODUCTIVITY IMPROVEMENT |
| | | | INADEQUATE PROVIDER ESTIMATING TOOLS AND/OR PROCESS |
| | | | INEXPERIENCED ESTIMATORS |
| | | | FAILURE TO INDEPENDENTLY VALIDATE SUBCONTRACT ESTIMATES |
| | | | NO PERFORM TEAM USED IN ESTIMATING OR VALIDATING ESTIMATES |
| | | | PROJECT TEAM INEXPERIENCE |
| | | | CUSTOMER RESOURCE INEXPERIENCE |
| | | | FAILURE TO ORGANIZE AN EFFECTIVE PROJECT TEAM |
| | | | FAILURE TO COMMUNICATE ROLES AND RESPONSIBILITIES |
| | | | INADEQUATE RESOURCE PLANNING |
| | | | UNAVAILABLE RESOURCES |
| | | | INTERNAL RESOURCE COMMITMENTS UNMET |
| | | | DIFFICULTY SECURING OUTSIDE OR CUSTOMER RESOURCES |
| | | | UNPLANNED TURNOVER OF KEY PROJECT TEAM MEMBERS |
| | | | OTHER PROJECT OFFICE CONSIDERATIONS |
| | | | |
| | | | |
| | | | |
| | | | |
| | | | |
| | | | TOTALS FOR THIS SECTION |

FIG. 4E

| ENGAGEMENT | TRANSITION/ TRANSFORMATION | STEADY STATE DELIVERY | SERVICE CATEGORY NAME |
|---|---|---|---|
| | | | PROJECT/ACCOUNT OFFICE - SECTION E |
| | | | SUBCONTRACTORS |
| | | | INADEQUATE SUBCONTRACTOR PERFORMANCE |
| | | | UNCLEAR OR INCOMPLETE SUBCONTRACT SOW |
| | | | FAILURE TO ADEQUATELY QUALIFY SUBS |
| | | | FAILURE TO ADEQUATELY MANAGE SUBS |
| | | | FAILURE TO REQUIRE APPROPRIATE PLANS AND DOCUMENTATION FROM SUBS |
| | | | BREAKDOWN IN COMMUNICATIONS WITH SUB |
| | | | OTHER PROJECT OFFICE CONSIDERATIONS |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

*FIG. 4F*

| ENGAGEMENT | TRANSITION/ TRANSFORMATION | STEADY STATE DELIVERY | SERVICE CATEGORY NAME |
|---|---|---|---|
| | | | PROJECT/ACCOUNT OFFICE - SECTION F |
| | | | PROVIDER INTERNAL - EXECUTION |
| | | | INADEQUATE PROJECT MANAGEMENT EXECUTION |
| | | | INADEQUATE PROJECT MANAGEMENT INTERNAL PROCESS |
| | | | INTERNAL COMMUNICATIONS |
| | | | INEFFECTIVE PROJECT TRANSITION FROM MARKETING TO PERFORM TEAM |
| | | | LACK OF SENIOR PROVIDER MANAGEMENT INVOLVEMENT |
| | | | POOR INTERNAL TEAMWORK |
| | | | UN-KEPT INTERNAL COMMITMENTS (WRITTEN) |
| | | | INADEQUATE INTERNAL TRAINING AND EDUCATION |
| | | | DETERMINE DELTA BETWEEN THE STEADY STATE PROCESS AND THE BID MODEL TO EVALUATE THE OVERALL BUSINESS IMPACT AND ACCOUNT PROFITABILITY |
| | | | |
| | | | |
| | | | |
| | | | |
| | | | |
| | | | |
| | | | |
| | | | |
| | | | |
| | | | |
| | | | |
| | | | TOTALS FOR THIS SECTION |

| ENGAGEMENT | TRANSITION/ TRANSFORMATION | STEADY STATE DELIVERY | SERVICE CATEGORY NAME |
|---|---|---|---|
| | | | PROJECT OFFICE INPUT INPUTS FROM OWNERS/PRACTITIONERS/SME'S OF EACH OF THE SERVICES/PROCESSES DEPLOYED |
| | | | PROCESS/PLAN EXECUTION - SECTION A |
| | | | FAILURE TO FOLLOW PLANS |
| | | | FAILURE TO FOLLOW PRICING PROCESS AND GUIDELINES |
| | | | FAILURE TO FOLLOW SDD/MD (OR INTERNAL) PROCESSES |
| | | | FAILURE TO FOLLOW QA OR TECHNICAL TEAM PROJECT REVIEW RECOMMENDATIONS |
| | | | INEFFECTIVE PROJECT START-UP STEPS |
| | | | INEFFECTIVE CHANGE CONTROL IMPLEMENTATION |
| | | | INADEQUATE TESTING PLANS AND STRATEGIES |
| | | | INADEQUATE INITIAL TECHNICAL VALIDATION OF SOLUTION |
| | | | FAILURE TO VALIDATE CAPABILITY TO MEET PERFORMANCE REQUIREMENTS |
| | | | WORK BEGAN BEFORE CONTRACT AND SOW WERE FINALIZED |
| | | | OTHER TEAM CONSIDERATIONS |
| | | | ENGAGEMENT/MARKETING TEAM NOT COMMUNICATING BID ASSUMPTIONS? INADEQUATE TRANSITION |
| | | | |
| | | | |
| | | | |
| | | | |
| | | | |
| | | | TOTALS FOR THIS SECTION |

*FIG. 5B*

| ENGAGEMENT | TRANSITION/ TRANSFORMATION | STEADY STATE DELIVERY | SERVICE CATEGORY NAME |
|---|---|---|---|
| | | | PROCESS/PLAN EXECUTION - SECTION B |
| | | | SOLUTION COMPLEXITY |
| | | | SERVICE LEVELS DIFFICULT TO MEET DUE TO STRINGENCY |
| | | | INADEQUATE INITIAL EVALUATION OF CUSTOMER PROBLEM |
| | | | INADEQUATE PROCESS |
| | | | INADEQUATE SYSTEM OR BUSINESS PERFORMANCE ISSUE |
| | | | INTEGRATION AND EXECUTION TOO COMPLEX |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

FIG. 5C

| ENGAGEMENT | TRANSITION/ TRANSFORMATION | STEADY STATE DELIVERY | SERVICE CATEGORY NAME |
|---|---|---|---|
| | | | PROCESS/PLAN EXECUTION – SECTION C |
| | | | STAFFING/ESTIMATING |
| | | | PRODUCTIVITY OVERESTIMATED |
| | | | INEXPERIENCED PROCESS ARCHITECTS |
| | | | DEPLOYMENT TEAM INEXPERIENCE |
| | | | CUSTOMER RESOURCE INEXPERIENCE/ DIFFICULT OR FAILS TO INTERSECT |
| | | | FAILURE TO ORGANIZE AN EFFECTIVE SERVICE DELIVERY TEAM |
| | | | FAILURE TO COMMUNICATE ROLES AND RESPONSIBILITIES |
| | | | UNAVAILABLE RESOURCES |
| | | | WERE ALL ASSUMPTIONS COMMUNICATED AND WAS THERE AN ASSUMED SCALED IMPROVEMENT IN PRODUCTIVITY? |
| | | | DIFFICULTY SECURING OUTSIDE OR CUSTOMER RESOURCES |
| | | | UNPLANNED TURNOVER OF KEY PROJECT TEAM MEMBERS |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | TOTALS FOR THIS SECTION |

FIG. 5D

| ENGAGEMENT | TRANSITION/ TRANSFORMATION | STEADY STATE DELIVERY | SERVICE CATEGORY NAME |
|---|---|---|---|
| | | | PROCESS/PLAN EXECUTION - SECTION E |
| | | | SUBCONTRACTORS |
| | | | INADEQUATE SUBCONTRACTOR PERFORMANCE |
| | | | UNCLEAR OR INCOMPLETE SUBCONTRACT SOW |
| | | | FAILURE TO ADEQUATELY QUALIFY SUBS |
| | | | FAILURE TO ADEQUATELY MANAGE SUBS |
| | | | FAILURE TO REQUIRE APPROPRIATE PLANS AND DOCUMENTATION FROM SUBS |
| | | | BREAKDOWN IN COMMUNICATIONS WITH SUB |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

FIG. 5E

| ENGAGEMENT | TRANSITION/ TRANSFORMATION | STEADY STATE DELIVERY | SERVICE CATEGORY NAME |
|---|---|---|---|
| | | | PROCESS/PLAN EXECUTION - SECTION F |
| | | | PROVIDER INTERNAL - EXECUTION |
| | | | INADEQUATE PROJECT MANAGEMENT EXECUTION |
| | | | |
| | | | INTERNAL COMMUNICATIONS |
| | | | INEFFECTIVE PROJECT TRANSITION FROM MARKETING TO PERFORM TEAM |
| | | | LACK OF SENIOR PROVIDER MANAGEMENT INVOLVEMENT |
| | | | POOR INTERNAL TEAMWORK |
| | | | UN-KEPT INTERNAL COMMITMENTS (WRITTEN) |
| | | | INADEQUATE INTERNAL TRAINING AND EDUCATION |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | |
| | | | TOTALS FOR THIS SECTION |

| ENGAGEMENT | TRANSITION/ TRANSFORMATION | STEADY STATE DELIVERY | SERVICE CATEGORY NAME |
|---|---|---|---|
|  |  |  | PROJECT OFFICE INPUT INPUTS FROM OWNERS/PRACTITIONERS/SME'S OF EACH OF THE SERVICES/PROCESSES DEPLOYED |
|  |  |  | TOOLS/METHODS - SECTION A |
|  |  |  | INEXPERIENCE WITH NEW TOOLS |
|  |  |  | INEXPERIENCE WITH USE OF NEW DEVELOPMENT METHODS |
|  |  |  | INADEQUATE INTERNAL DEVELOPMENT METHODS |
|  |  |  | INADEQUATE TOOLS |
|  |  |  | INADEQUATE INTERNAL TRAINING ON USE OF NEW METHODS AND TOOLS |
|  |  |  | OTHER TEAM CONSIDERATIONS |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  | TOTALS FOR THIS SECTION |

*FIG. 6B*

| ENGAGEMENT | TRANSITION/ TRANSFORMATION | STEADY STATE DELIVERY | SERVICE CATEGORY NAME |
|---|---|---|---|
| | | | TOOLS/METHODS - SECTION B |
| | | | SOLUTION OR PRODUCT/COMPLEXITY |
| | | | SERVICE LEVELS DIFFICULT TO MEET DUE TO STRINGENCY |
| | | | INTEGRATION COMPLEXITY |
| | | | WAS ARCHITECTURE UNDERSTOOD IN ENGAGEMENT (PERFORMANCE ENGINEERING MODEL) |
| | | | NEW OR UNANNOUNCED PRODUCT PERFORMANCE/INTEGRATION |
| | | | THIRD PARTY PRODUCT PERFORMANCE/INTEGRATION |
| | | | TIMELY PRODUCT AVAILABILITY |
| | | | AVAILABILITY OF NEW TECHNOLOGY |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

FIG. 6C

| ENGAGEMENT | TRANSITION/ TRANSFORMATION | STEADY STATE DELIVERY | SERVICE CATEGORY NAME |
|---|---|---|---|
| | | | TOOLS/METHODS - SECTION C |
| | | | STAFFING/ESTIMATING |
| | | | PRODUCTIVITY OVERESTIMATED |
| | | | INCORRECT ASSUMPTION REGARDING PRODUCTIVITY IMPROVEMENT |
| | | | INADEQUATE PROVIDER ESTIMATING TOOLS |
| | | | INEXPERIENCED TECHNOLOGISTS |
| | | | FAILURE TO INDEPENDENTLY VALIDATE SUBCONTRACT ESTIMATES |
| | | | TECHNOLOGY TEAM INEXPERIENCE |
| | | | CUSTOMER RESOURCE INEXPERIENCE |
| | | | FAILURE TO ORGANIZE AN EFFECTIVE TOOLS TEAM |
| | | | FAILURE TO COMMUNICATE ROLES AND RESPONSIBILITIES |
| | | | INADEQUATE RESOURCE PLANNING |
| | | | UNAVAILABLE RESOURCES |
| | | | INTERNAL RESOURCE COMMITMENTS UNMET |
| | | | DIFFICULTY SECURING OUTSIDE OR CUSTOMER TECHNICAL RESOURCES |
| | | | UNPLANNED TURNOVER OF KEY PROJECT TEAM MEMBERS |
| | | | |
| | | | |
| | | | |
| | | | |
| | | | |
| | | | |
| | | | |
| | | | |
| | | | TOTALS FOR THIS SECTION |

FIG. 6D

| ENGAGEMENT | TRANSITION/ TRANSFORMATION | STEADY STATE DELIVERY | SERVICE CATEGORY NAME |
|---|---|---|---|
| | | | TOOLS/METHODS - SECTION D |
| | | | SUBCONTRACTOR |
| | | | INADEQUATE SUBCONTRACTOR PERFORMANCE |
| | | | UNCLEAR OR INCOMPLETE SUBCONTRACT SOW |
| | | | FAILURE TO ADEQUATELY QUALIFY SUBS |
| | | | FAILURE TO ADEQUATELY MANAGE SUBS |
| | | | FAILURE TO REQUIRE APPROPRIATE PLANS AND DOCUMENTATION FROM SUBS |
| | | | BREAKDOWN IN COMMUNICATIONS WITH SUB |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | TOTALS FOR THIS SECTION |

*FIG. 6E*

| ENGAGEMENT | TRANSITION/ TRANSFORMATION | STEADY STATE DELIVERY | SERVICE CATEGORY NAME |
|---|---|---|---|
| | | | TOOLS/METHODS – SECTION E |
| | | | PROVIDER INTERNAL - EXECUTION |
| | | | INADEQUATE PROJECT MANAGEMENT EXECUTION |
| | | | INADEQUATE PROJECT MANAGEMENT INTERNAL PROCESS |
| | | | INTERNAL COMMUNICATIONS |
| | | | INEFFECTIVE PROJECT TRANSITION FROM MARKETING TO PERFORM TEAM |
| | | | LACK OF SENIOR PROVIDER MANAGEMENT INVOLVEMENT |
| | | | POOR INTERNAL TEAMWORK |
| | | | UN-KEPT INTERNAL COMMITMENTS (WRITTEN) |
| | | | INADEQUATE INTERNAL TRAINING AND EDUCATION |
| | | | OTHER TEAM CONSIDERATIONS |
| | | | |
| | | | |
| | | | |
| | | | |
| | | | |
| | | | |
| | | | |
| | | | |
| | | | |
| | | | |
| | | | TOTALS FOR THIS SECTION |

INTERFACE/INTERSECTION VALIDATION FORM

INTERFACE/INTERSECTION DEFINITION - (PROCESS NAME)

ACCOUNT: _____

LAST REVISION DATE: _____

PROCESS/SERVICE OWNERS: _____

- SOURCE ENTITY: _____
- SOURCE PROCESS: _____
- SOURCE SUBPROCESS: _____
- RECEIVING ENTITY: _____
- RECEIVING PROCESS: _____
- RECEIVING SUBPROCESS: _____
- SOURCE TOOL: _____
- RECEIVING TOOL: _____
- INFORMATION PASSED: _____
- PASSING AUTHORITY: _____
- INFORMATION RECEIVED: _____
- RECEIVING AUTHORITY: _____
- CRITICAL TIME FACTOR: _____

ADDITIONAL REQUIREMENTS: _____

_____

_____

_____

_____

NOTES: _____

THE EXIT CRITERIA IS INTENDED TO BE A CHECKLIST OF ITEMS THAT NEED TO BE COMPLETED IN ORDER FOR THE PROJECT TO BE CONSIDERED "OUT OF TRANSFORMATION." THE FOLLOWING EXAMPLES MAY BE MODIFIED TO MEET THE NEEDS OF THE OPPORTUNITY

A CHECKLIST SHOULD BE COMPLETED WITH THE TRANSITION MANAGER, SERVICE DELIVERY MANAGER AND THE STEADY STATE (TRANSITION TEAM LEADER) PRESENT. ALL SHOULD BE IN AGREEMENT THAT THE EXIT CRITERIA ITEMS ARE COMPLETE AND/OR AGREED THAT ITEMS WILL BE COMPLETED BY SERVICE DELIVERY.

EXIT CRITERIA:

- —— DELIVERABLE COMPLETION CRITERIA MET - PER AGREEMENT/MOU/DOU ETC.
- —— EACH DELIVERABLE EXIT CRITERIA COMPLETED - (SHOULD BE LISTED SEPARATELY)
- —— SYSTEMS MANAGEMENT CONTROLS - IN USE AND DOCUMENTED
    - PROBLEM MANAGEMENT PROCESS
    - CHANGE MANAGEMENT PROCESS
    - RECOVERY MANAGEMENT PROCESS
    - SLA MANAGEMENT PROCESS
    - PERFORMANCE MANAGEMENT PROCESS
    - CAPACITY MANAGEMENT PROCESS
- —— REPORTS IN USE
    - DAILY REPORTS
    - WEEKLY REPORTS
    - MONTHLY REPORTS
    - SPECIAL REPORTS
- —— INFO TOOL
    - ADHERENCE AND INTEGRATION TO EXISTING SMC MEETING MODIFICATION COMPLETED
    - SQL DATABASE COMPLETE AND IN USE
    - CUSTOMER TRAINING COMPLETED
- —— DAILY TURNOVER MEETINGS
    - CHANGE MEETINGS
    - RCA MEETINGS
- —— SYSTEM/NETWORK MONITORING ENVIRONMENT
    - AUTOMATION
    - CONSOLE OPERATIONS INSTALLED AND WORKING
    - NETWORK OPERATIONS INSTALLED AND WORKING
- —— SECURITY

FROM FIG. 12A

DATA SECURITY INSTALLED AND WORKING
IAS DOCUMENTATION COMPLETE (EITHER ADHERENCE TO ITCS 200 OR WHATEVER THE CUSTOMER WANT TO USE)
REGISTRATION PROCESS DEFINED AND WORKING
— AUDIBILITY
    REVIEW BY SITE ASSURANCE OF THE TRANSITION PROJECT
    AUDIBILITY PROJECT FILE (DOCUMENTATION, SIGN-OFFS)
— REQUIREMENTS PROCESS ARE IN PLACE
    DOCUMENTED CUSTOMER CONCURRENCE/AGREEMENT
— DOCUMENTATION IS COMPLETE (FOR A GIVEN PROCESS/FUNCTION/PROJECT)
    DOCUMENT OF UNDERSTANDING BETWEEN PE AND DELIVERY SITE
    OPERATIONS PROCEDURES MANUAL
— OPERATING/TOPOLOGY/CONFIGURATION
    DIAGRAMS OF THE LAN ENVIRONMENTS, NETWORK ENVIRONMENT
— PROCESS DEFINED FOR TOPOLOGY CHANGES, E.G., REMOTE PRINTER ADDITION
    TRANSITION/BUBBLE EQUIPMENT RETURN PLAN IN PLACE
— CUSTOMER PARTNERSHIP COMMUNICATIONS (IN PLACE AND FUNCTIONAL)
    ALERT PROCESS IN USE
    ESCALATION PATH ESTABLISHED AND IN USE
    CUSTOMER CONTACT LIST IN USE
    COVERAGE CONTACT LIST PROCESS IN USE
    STATUS MEETING COMMUNICATION ESTABLISHED AND IN USE
— STEADY STATE MAINTENANCE/UPGRADE PLAN (IN PLACE - MAINTENANCE FUNCTIONAL)
    DOCUMENTATION OF UNIQUE UPGRADE REQUIREMENTS
    PERSONNEL CUSTOMER FREEZE PERIODS
    TESTING METHODOLOGY
— RESOURCES/BUDGETS FOR STEADY STATE OPERATIONS
    HARDWARE
    SOFTWARE
    DOCUMENTED AND AGREED TO
    INTERLOCK RESOURCE PLAN
    ENSURE MODEL RESOURCES EQUALS PE RESOURCES
    ADDRESS OUT OF PROFILE CHANGES WITH ADDITION/SUBTRACTION
— MEASUREMENTS AND REPORTING PACKAGE

TO FIG. 12C

*FIG. 12C*   FROM FIG. 2B

LAN AVAILABILITY, RESPONSE TIME ETC.
    CONFIRM START DATE
    VERIFICATION OF DATA INTEGRITY DONE
    INTERLOCK WITH PE ON WHAT IS BEING PROVIDED (UP FRONT)
    UNIQUE CUSTOMER REQUIREMENTS IN PLACE
    DELIVERY OF FIRST SET OF REPORTS TO PROJECT EXECUTIVE
— TRAINING
    OPERATOR
    SERVERS/LANS
    APPLICATIONS
    TOOLS
    HELP DESK
    CUSTOMER AND VENDOR
    SMC
    PROCESS
    INFO TOOL
    FOLLOW-UP VENDOR TRAINING IF NEEDED
— KNOWN RISKS AND EXPOSURES
    IDENTIFIED
    DOCUMENTED
— TRANSITION TO STEADY STATE TURNOVER
    DELIVERY MANAGER IDENTIFIED AND IN PLACE
    UNDELIVERED TRANSITION ITEMS
    OWNER IDENTIFIED ITEMS AGREED TO
    DELIVERY TRANSITION (TRANSITION MANAGER) DOCUMENTED SIGN-OFF
— FORMAL SIGN-OFF
    DELIVERY SIGN-OFF (ACCOUNT MANAGER)
    MANAGER OF DELIVERY (VARIES BY ACCOUNT)
— POST MORTEM
    OF THE TRANSITION PROJECT BY THE TRANSITION MANAGER IS SCHEDULED
      AND DOCUMENTED REVIEW OF THE POST MORTEM RESULTS WITH
      DELIVERY TEAM

NOTE: IT SHOULD BE UNDERSTOOD THAT THIS LIST MAY REQUIRE MODIFICATION TO FIT EACH OF THE TRANSITION PROCESSES AND THAT THIS LIST IS NOT INCLUSIVE.

FIG. 12D

EXIT CRITERIA CHECKLIST/SIGN-OFF

| EXIT CRITERIA DESCRIPTION | PERSON ASSIGNED | TARGET DATE | COMP DATE |
|---|---|---|---|
| DELIVERABLE COMPLETION CRITERIA | ———— | _/_/_ | _/_/_ |
| SYSTEMS MANAGEMENT CONTROLS | ———— | _/_/_ | _/_/_ |
| SYSTEM/NETWORK MONITORING ENVIRONMENT | ———— | _/_/_ | _/_/_ |
| SECURITY | ———— | _/_/_ | _/_/_ |
| AUDIBILITY | ———— | _/_/_ | _/_/_ |
| REQUIREMENTS PROCESS IN PLACE | ———— | _/_/_ | _/_/_ |
| DOCUMENTATION COMPLETE | ———— | _/_/_ | _/_/_ |
| OPERATING/TOPOLOGY/CONFIGURATION | ———— | _/_/_ | _/_/_ |
| CUSTOMER PARTNERSHIP COMMUNICATIONS | ———— | _/_/_ | _/_/_ |
| STEADY STATE | ———— | _/_/_ | _/_/_ |
| MAINTENANCE/UPGRADE PLAN | ———— | _/_/_ | _/_/_ |
| RESOURCES/BUDGETS FOR STEADY STATE | ———— | _/_/_ | _/_/_ |
| OPERATIONS | ———— | _/_/_ | _/_/_ |
| MEASUREMENTS AND REPORTING PACKAGE | ———— | _/_/_ | _/_/_ |
| TRAINING | ———— | _/_/_ | _/_/_ |
| KNOWN RISKS AND EXPOSURES | ———— | _/_/_ | _/_/_ |
| TRANSITION TO STEADY STATE TURNOVER | ———— | _/_/_ | _/_/_ |
| FORMAL SIGN-OFF | ———— | _/_/_ | _/_/_ |
| POST MORTEM | ———— | _/_/_ | _/_/_ |

LEGEND:

COMPLETE DATE: FILL OUT WHEN ITEM IS COMPLETE

FOLLOW-UP REQUIRED: DESCRIPTION OF FOLLOW-UP ITEM

A TRANSITION TURNOVER FORM HAS ALSO BEEN PROVIDED TO ASSIST WITH ITEMS THAT HAVE NOT BEEN COMPLETED BEFORE THE TRANSITION MANAGER LEAVES THE PROJECT. THIS TOOL PROVIDED FOR OWNERSHIP OF TRANSITION ITEMS TO COMPLETION.

EXIT CRITERIA CHECKLIST/SIGN-OFF

| NAME(PRINT) | TITLE | SIGNATURE | DATE |
|---|---|---|---|
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |
| _____ | _____ | _____ | _/_/_ |

*FIG. 12E*

EXIT CRITERIA
TRANSITION TEAM ITEM TURNOVER FORM

PROJECT NAME: _____

TASK ITEM NUMBER: _____

TARGET DATE FOR COMPLETION: _/_/_

DESCRIPTION OF ITEM: _____

_____

_____

_____

_____

TRANSITION MANAGER (PRINT): _____

TRANSITION MANAGER (SIGNATURE): _____

DATE: _/_/_

ACCOUNT MANAGER (PRINT): _____

ACCOUNT MANAGER (SIGNATURE): _____

DATE: _/_/_

STEADY STATE MANAGER (PRINT): _____

STEADY STATE MANAGER (SIGNATURE): _____

DATE: _/_/_

COMPLETION DATE: _/_/_

*FIG. 12F*

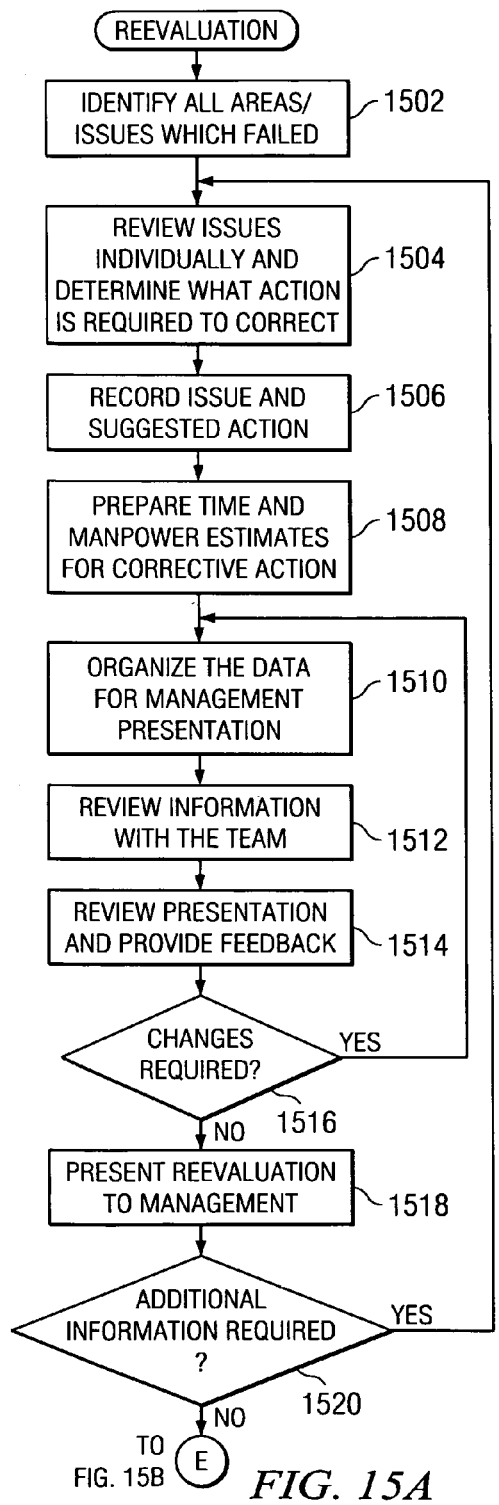
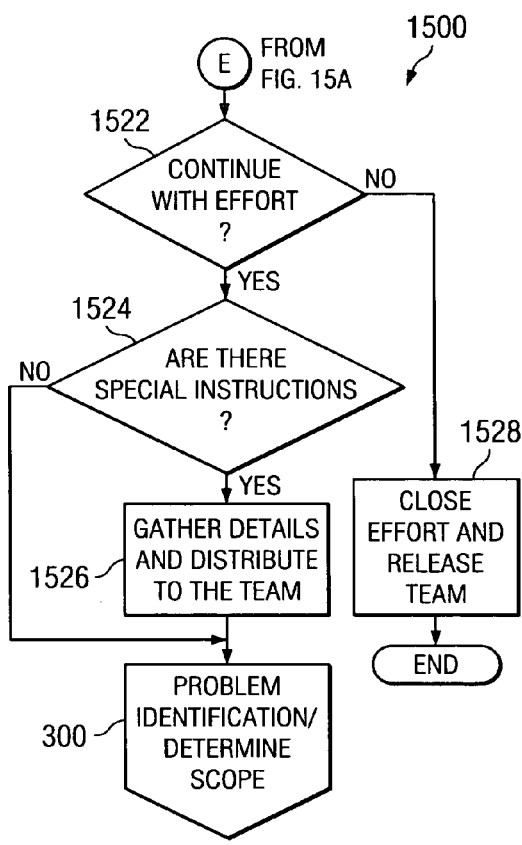
FIG. 15A
FIG. 15B

FIG. 18

| NAME OF THE SERVICE TO BE REVIEWED: | |
|---|---|
| CATEGORIES | RATING |
| DESIGN OF SERVICE | |
| COMPLEX (SIGNIFICANT AMOUNT OF WORK. FOR EXAMPLE, MAY SPAN MULTIPLE ENVIRONMENTS, AND REQUIRE CONSIDERABLE SUPPORT) | ADD 10 |
| MODERATE (AVERAGE AMOUNT OF WORK. FOR EXAMPLE, MAY SPAN ONE OR MORE ENVIRONMENTS AND REQUIRE MODERATE SUPPORT) | ADD 5 |
| SIMPLE (MINOR WORK FOR IMPLEMENTING AND ONGOING SUPPORT) | ADD 1 |
| INTER DEPENDENCIES | |
| THE SERVICE HAS A LARGE AND/OR SIGNIFICANT NUMBER OF DEPENDENCIES OR INTERACTIONS WITH OTHER SERVICES WHICH MUST BE MANAGED MANUALLY | ADD 10 |
| THE SERVICE HAS A SMALL AND/OR INSIGNIFICANT NUMBER OF DEPENDENCIES OR INTERACTIONS WITH OTHER SERVICES | ADD 5 |
| THE SERVICE IS COMPLETELY INDEPENDENT OF OTHER SERVICES | ADD 1 |
| TECHNOLOGY EMPLOYED/TO BE EMPLOYED | |
| THE TECHNOLOGY IS STABLE IN THIS APPLICATION, BUT REQUIRES ADJUSTMENTS TO MAKE FUNCTIONAL | ADD 10 |
| CUSTOMER OWNED TECHNOLOGY INTERSECTION ISSUES | ADD 10 |
| THE SOLUTION CAN BE UPDATED OR CHANGED, AND REQUIRES SOME LEVEL OF DETAIL ATTENTION | ADD 5 |
| THE SOLUTION IS STABLE WITH LITTLE OR NO ATTENTION AFTER IMPLEMENTATION | ADD 1 |
| HISTORY OF THE SERVICE | |
| THIS TYPE OF SERVICE HAS NEVER BEEN SUCCESSFULLY IMPLEMENTED AT/BY THE CUSTOMER | ADD 10 |
| THIS TYPE OF SERVICE HAS BEEN IMPLEMENTED PREVIOUSLY BUT HAS BEEN TROUBLESOME | ADD 7 |
| THIS TYPE OF SERVICE HAS BEEN IMPLEMENTED INFREQUENTLY | ADD 3 |
| THIS TYPE OF SERVICE HAS BEEN IMPLEMENTED FREQUENTLY WITHOUT TROUBLE | ADD 0 |
| OVERALL IMPLEMENTATION/ONGOING SUPPORT COST OF THE SERVICE (CONSIDERS ALL OF THE ABOVE CATEGORIES) | |
| COMPLEX | ADD 10 |
| MODERATE | ADD 5 |
| SIMPLE | ADD 1 |
| SUMMARY OF TOTALS FROM EACH CATEGORY ABOVE | TOTALS |
| DESIGN OF SERVICE | |
| INTER DEPENDENCIES | |
| TECHNOLOGY EMPLOYED/TO BE EMPLOYED | |
| HISTORY OF THE SERVICE | |
| OVERALL IMPLEMENTATION COMPLEXITY OF THE SERVICES | |
| OVERALL TOTAL | |
| SERVICE RATING | |
| LOW RISK | 0-8 |
| MEDIUM RISK | 9-15 |
| HIGH RISK DESIGN WORK AND TECHNOLOGY ISSUES | 16+ |
| SUGGESTED DIRECTION | GO/NO GO* |

BSM PROBLEM ANALYSIS METHOD

FIELD OF THE INVENTION

The present invention includes subject matter drawn to a system and method for analyzing the delivery of business systems management services.

BACKGROUND OF THE INVENTION

Today's distributed processing business systems often include resources from multiple vendors and platforms connected through large open networks. To understand the status of a particular resource in a modern business system is to comprehend only a small part of the picture. To truly maximize the business value of business system investments, a business also must see how each resource affects the applications and business processes it supports.

Many resources in a distributed processing system are interdependent, and businesses must be able to demonstrate and leverage linkages between business systems and business processes. These links are critical to being agile, allowing business processes to drive technology decisions and priorities. Without these links, a business has virtually no way of knowing how an individual resource, or group of resources impact a given business process. If, for example, a particular Web server were to go down, a business would not be able to identify specific business processes that would be adversely affected.

Business systems management (BSM), also sometimes referred to as "business service management," is an evolving technology that can be employed to help a business understand how the performance and availability of technology resources affect the applications, processes, and services that power a business. BSM technologies help a business prioritize technology resources that carry the highest business values, not just the latest problem that crops up. Revenue-generating activities, such as order processing—rather than internal processes, such as a human resources system—are prioritized in the event of a problem or outage.

BSM software products, such as TIVOLI Business Systems Manager from International Business Machines Corporation, enable a business to align daily operations management with business priorities, set and meet service level commitments, implement predictive management capabilities across business systems infrastructure, and generate reports to keep executives and business units that use the business's services informed and productive.

Problem management techniques, though, have not kept pace with the rest of BSM technology. Unlike the modern business systems just described, early business systems were based upon a relatively simple mainframe design that generally comprised a single mainframe computer connected to user terminals through a closed network. Problems in these early business systems could be detected simply by monitoring the network and the mainframe computer for undesired or unexpected performance. Likewise, any such problems could be resolved by repairing or adjusting one of these two components.

Clearly, such limited problem management techniques are inadequate for analyzing problems in a modern, complex business system in which the links between business systems and business processes are so critical. To effectively resolve problems in a modern business system, a business first must be able to identify the source of the problem—which itself may be a daunting task. The source of the problem could be a technology resource, a business process, a link between a resource and a process, or any combination thereof. Problem identification, though, is not the only new hurdle for modern business systems management. A single change to a single component of a business system can have widespread effects on many interdependent components. Sometimes, such changes can produce unexpected and undesired results. Thus, once a problem has been identified, a business also must be able to evaluate possible solutions to determine the effect of the solution on the business system as a whole.

Accordingly, there currently is a need for a problem management system that can identify a problem in a modern business system and evaluate the effect of a solution on the business system as a whole.

SUMMARY OF THE INVENTION

The invention described in detail below is a method for analyzing a problem in a distributed processing business system used to provide a service. The method comprises identifying the problem; preparing for an audit; performing the audit; reviewing the audit; developing an action plan; developing an execution plan; deploying a solution in accordance with the execution plan; monitoring the deployed solution; and recording lessons learned.

Alternatively, the method may be applied to evaluate the capacity of a distributed processing business system to provide a prospective service. In this alternative embodiment, the method comprises identifying the problem; preparing for an audit; performing the audit; reviewing the audit; preparing a rating table; populating the rating table with results from the audit; calculating a service rating based upon the results entered in the rating table; and presenting the service rating to management. If approved, the service provider develops an action plan; develops an execution plan; deploys a solution in accordance with the execution plan; monitors the deployed solution; and records lessons learned.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIGS. 4A-4F is an exemplary worksheet used in the Problem Identification sub-process for identifying problems in the project office data;

FIGS. 5A-5E is an exemplary worksheet used in the Problem Identification sub-process for identifying problems with a process or processes;

FIGS. 6A-6E is an exemplary worksheet used in the Problem Identification sub-process for identifying problems with a procedure or procedures;

FIG. 7 is an exemplary interface/intersection validation form;

FIGS. 12A-12F is an exemplary exit criteria worksheet;

FIGS. 15A-15B is a flowchart of the Reevaluate sub-process;

FIG. 18 is an exemplary rating table.

DETAILED DESCRIPTION OF THE PREFERRED EMBODIMENT

The inventive analysis methodology described in detail below generally is applied to business systems that are used to deliver a service to a consumer. In this context, a "consumer" may be internal or external to the service provider, and a "service" represents any function having tangible or intangible value to the consumer. The methodology comprises techniques for evaluating, researching, and analyzing processes and technology associated with a service. More particularly, the methodology provides a means to evaluate, research, and analyze "problems" with processes and technologies associated with a service. Moreover, the methodology may be applied to a service as a whole, to any distinct process used to deliver a service, and may be applied throughout the timeline of a service. The service may be an existing service or a prospective service.

Of course, the term "problem" has many definitions and implications associated with it, which depend on context. For example, poor financial performance or failing to meet contract and customer expectations are conditions that may indicate a problem with the underlying processes or technology. Sometimes, though, the methodology may be invoked even in the absence of any specific problem indicators, such as when a customer or provider believes there is room for improvement.

Figure 1:
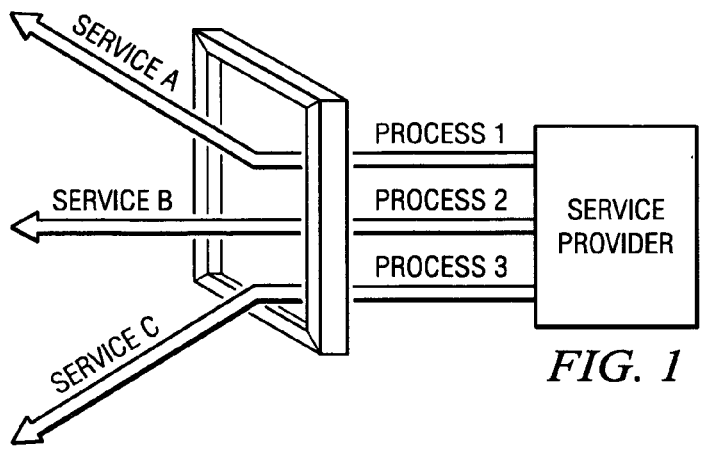
FIG. 1 illustrates the relationship between a process and a service.

Before describing this methodology in detail, it is important to clarify some nomenclature. In particular, is important to distinguish services from processes and procedures. FIG. 1 is a diagram that illustrates the relationship between a service and processes. "Processes" are internal activities that a business uses to deliver a service. As FIG. 1 indicates, the same process or processes may be used to provide a variety of services. "Technology" refers to the tools that are exploited in the course of executing those processes. Technology includes computer hardware and software. "Procedures" are activities that employ the tools to animate the processes that deliver the service.

It also is important to identify the various roles of participants in the activities required to deliver a service. There are four distinct roles within this methodology, although the same individual might fill several roles. A brief overview of these roles is provided here, but more specific responsibilities will be identified as the details of the inventive methodology are described below. First, the "project office" or "account office" is responsible for ensuring that service is delivered according to contractual obligations, and for monitoring the financial performance of the service delivery. Second, a "service delivery manager" or "account manager" is responsible for delivering all services for a specific account according to contractually defined service-level agreements. Third, an "auditor" is responsible for the auditing activities described below. The auditor also is responsible for coordinating all activities, developing the scope of an audit, and completing worksheets. Fourth, the "delivery team" is responsible for executing procedures and processes that support service delivery for a specific account in accordance with contractual service-level agreements. Members of the delivery team also participate in developing the scope of an audit, provide input to the audit, and analyze the results of the audit.

Figure 2A:
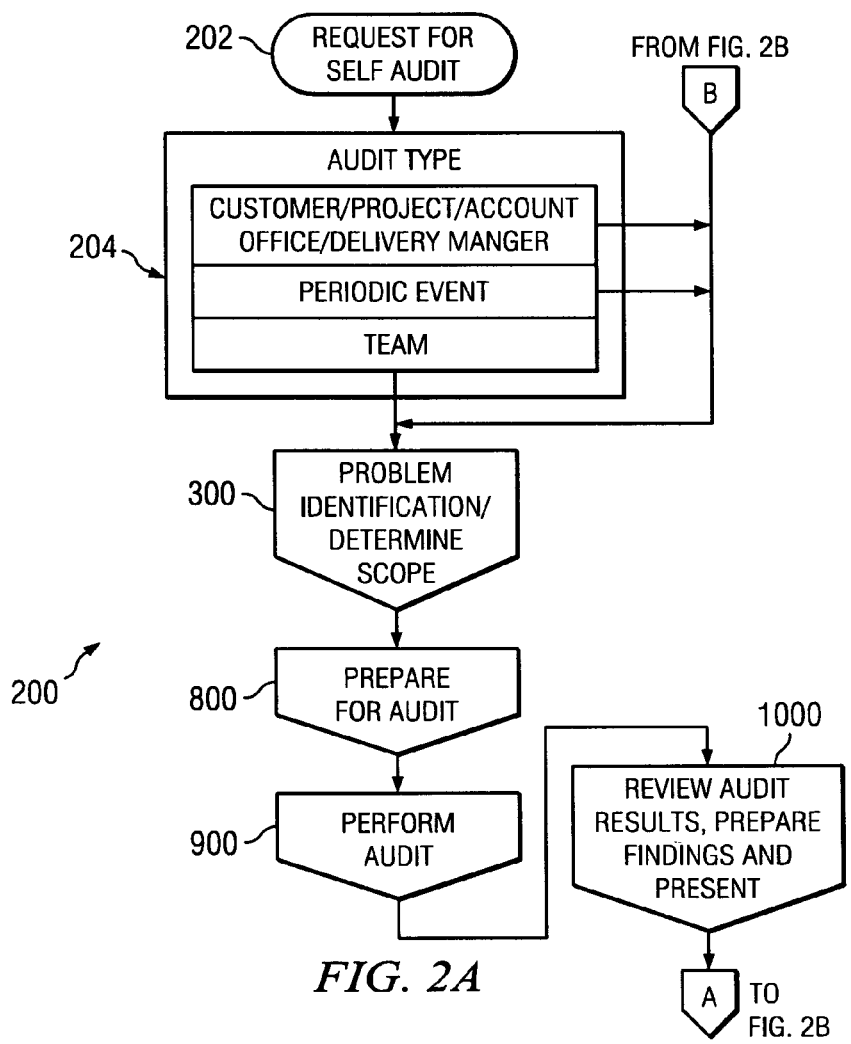
FIGS. 2A-2B provides an overview of the problem analysis methodology.
Figure 2B:
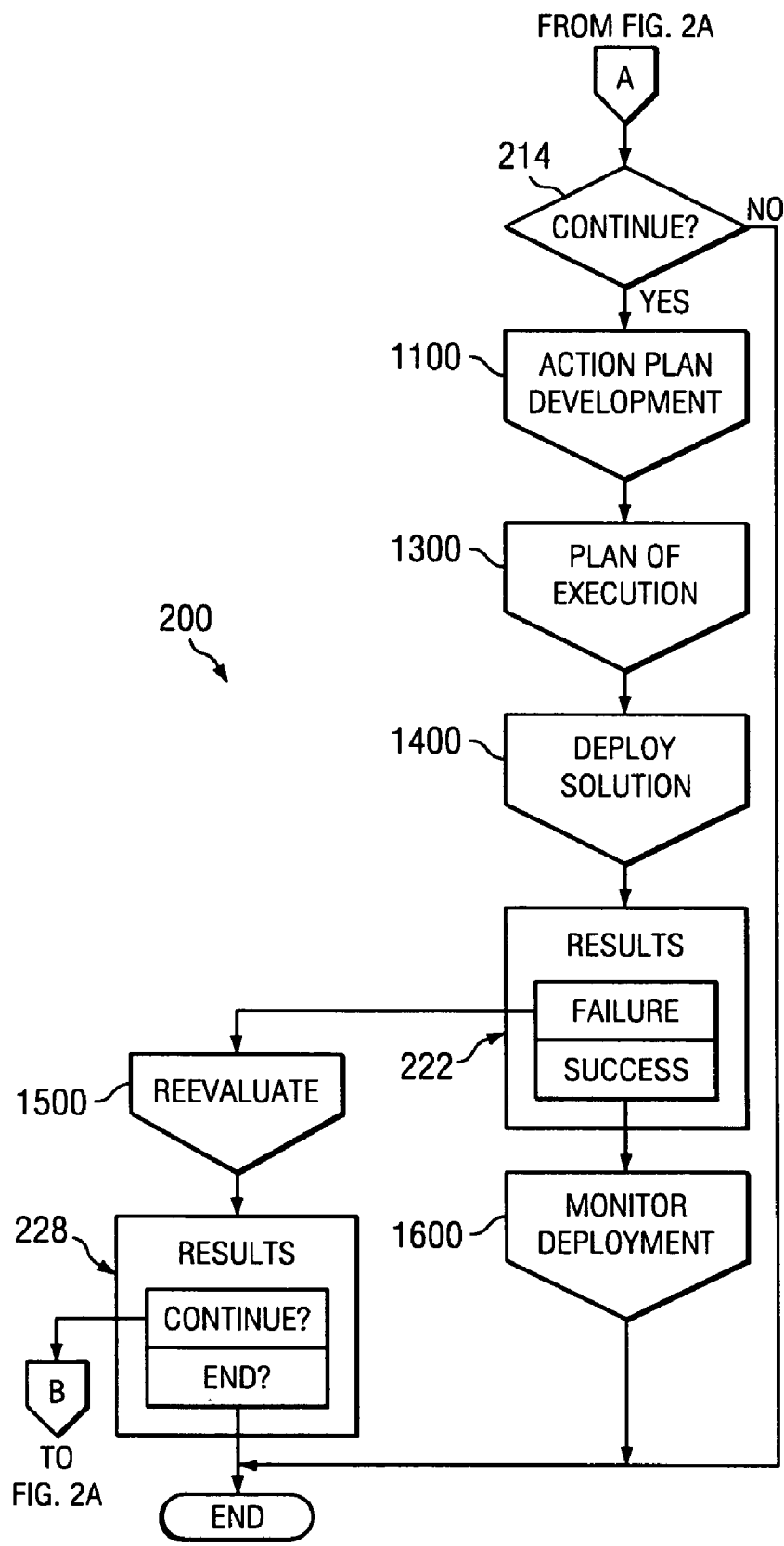

FIG. 2 provides an overview of the inventive methodology applied to an existing service. The methodology is referred to hereinafter as the "problem analysis" methodology. As FIG. 2 illustrates, the problem analysis methodology (200) may be initiated (202) as a periodic event or the result of a request from a customer, the project office, the service delivery manager, or the delivery team (204). Once initiated, the auditor identifies the problem and determines the scope of the audit (300). The auditor then prepares for the audit (800), performs the audit (900), reviews the results of the audit, (1000) and then presents the results to management. Management determines whether to continue (214). If management determines to continue, the auditor develops an action plan for updating the processes or technology (1100). The auditor next prepares a plan of execution consistent with the action plan (1300). The delivery team then deploys the solution in accordance with the plan of execution (1400). As the delivery team deploys the solution, errors or unknown events may impact the success of the deployment (222). If the deployment is unsuccessful, the Reevaluation sub-process is invoked to address these issues (1500). If the deployment is successful, it is monitored in the production environment to ensure that it functions and performs as expected (1600). If unexpected errors are revealed during this monitoring process, the Reevaluation sub-process may be invoked to correct these errors (228). Each of these activities is described in more detail below.

Figure 3:
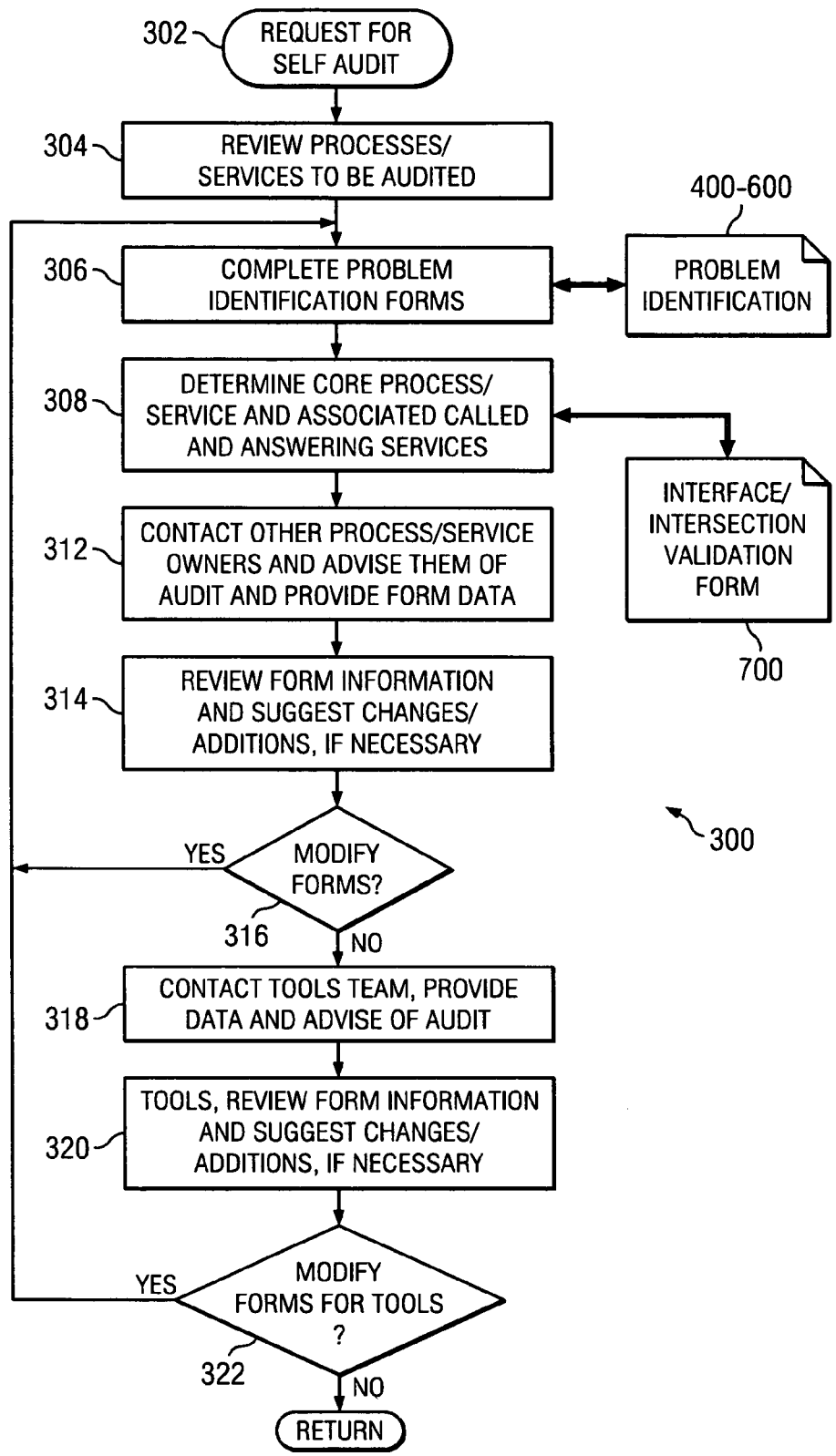
FIG. 3 is a flowchart of the Problem Identification sub-process.

FIG. 3 illustrates the Problem Identification sub-process (300). The Problem Identification sub-process focuses on project office data (which may include service delivery data), processes and procedures, and technology. Upon receiving a request for an audit (302), the auditor reviews the processes and services that are the subject of the request (304). To guide the analysis, an auditor completes a worksheet for the project office data, processes and procedures, and technology (306). Exemplary worksheets are provided in FIGS. 4, 5, and 6. The auditor may request support from associated services to ensure that the best information is included. The auditor then determines the core process or service, and associated called and answering services (308). The selected core process or service generally works with other processes to perform a service. As such, the core service must consider the associated services that contribute to either the success or the failure of the service. The auditor reviews the service from end-to-end, and completes the interface/intersection validation form. An exemplary embodiment of this form, which considers the calls and answers as well as the technology that enables it, is illustrated in FIG. 7. The auditor then contacts other process or service owners and advises them of the audit and provides data from the worksheets and validation form (312). The delivery teams then review their schedules and reserve time for the audit. Next, the team reviews the information provided by the auditor and if necessary offers changes or suggestions to the forms (314). This effort is intended to make the data as complete and robust as possible prior to the audit. If the delivery team offers changes or suggestions (316), the auditor updates the problem identification forms to reflect these changes or suggestions (306). The auditor next provides the forms to technologists and advises them of the impending audit (318). The technologists also review the forms and determine if they can add any information or contribute any change data (320). If necessary (322), the auditor then updates the problem identification forms again (306).

Figure 8A:
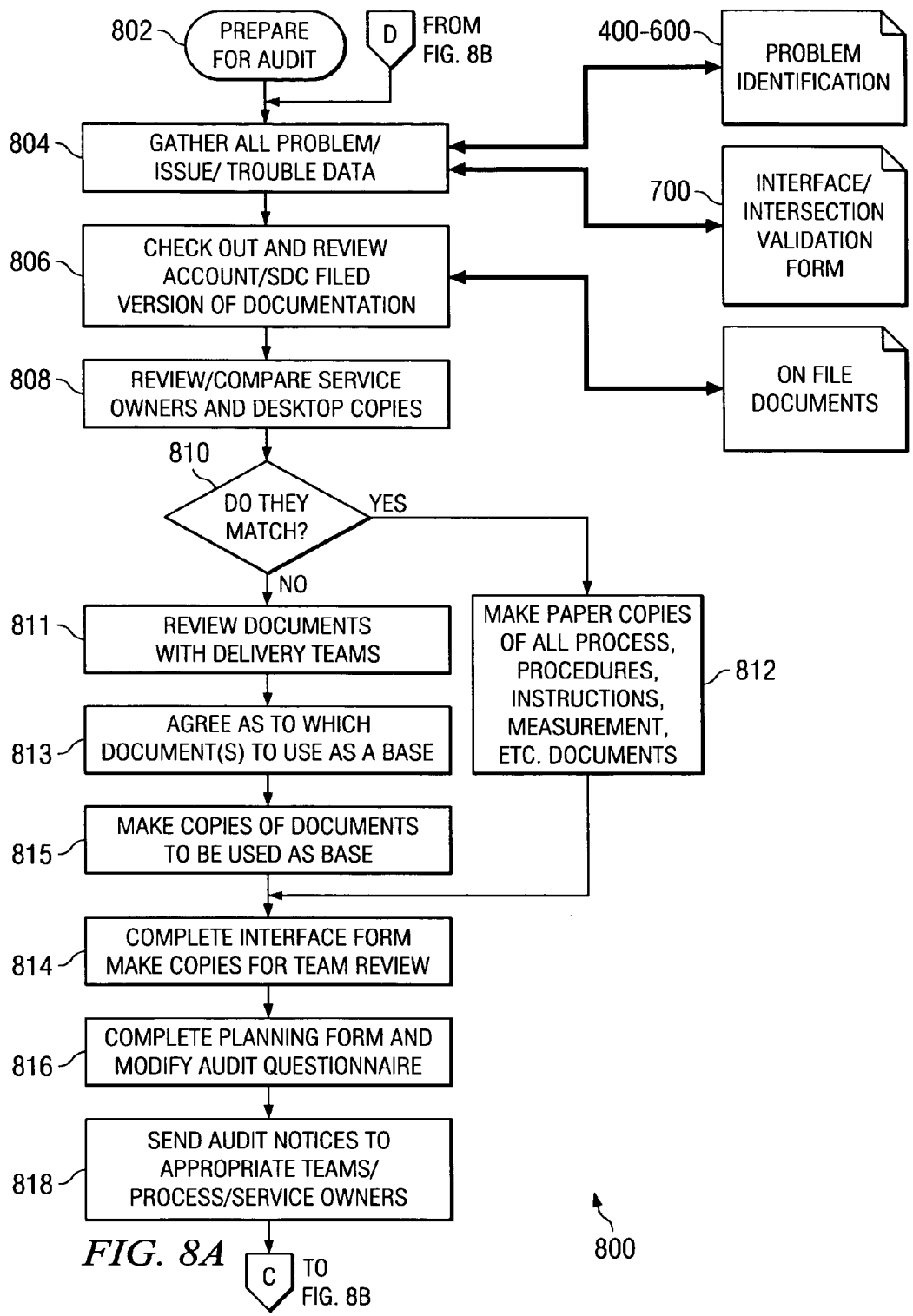
FIGS. 8A-8B is a flowchart of the Prepare for Audit sub-process.
Figure 8B:
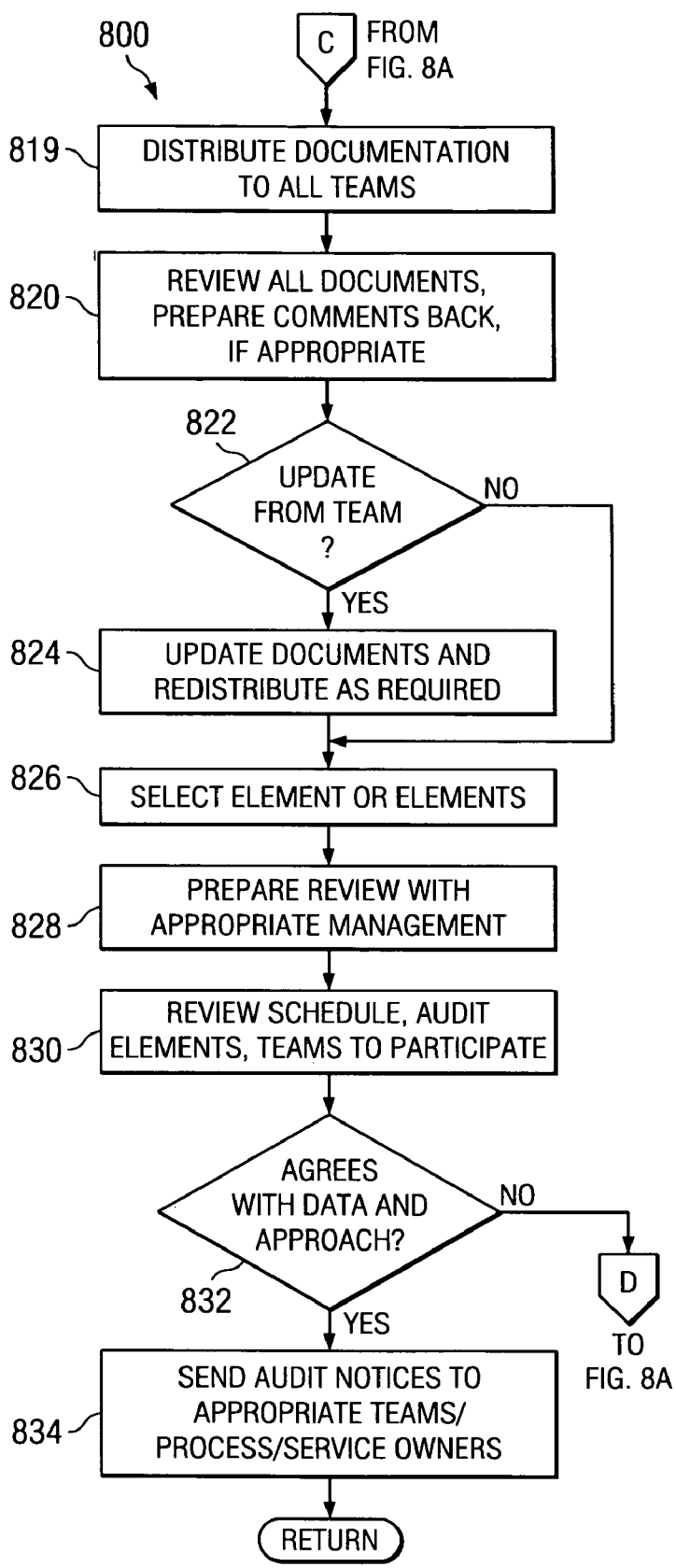

FIG. 8 illustrates the Prepare for Audit sub-process (800). To prepare for an audit (802), an auditor first collects all problem identification worksheets completed during earlier steps (804). The auditor also collects other relevant information, such as process documents, procedures, instructions, policies, measurements, service level agreements, contract details, etc. The auditor then reviews all documents and information (806-808) to ensure that they include consistent data, such as version numbers, the number of pages, workflows, etc. If the data is inconsistent (810), the auditor reviews the documents with the delivery teams (811). The auditor and the delivery teams must then agree which version of the documents or data best addresses the elements of the service (813). If the data is consistent (810) or has been agreed upon (813), the auditor makes paper copies of all documents (812, 815), completes the interface forms, and makes copies for team review (814). The auditor then prepares an audit plan and an audit questionnaire (816). The auditor next sends audit notices to appropriate teams (818). The teams then identify relevant resources and allocate time for the audit. Next, the auditor sends all finalized reference documents to the team members that have been identified to support the audit (819). Each team then reviews the documents as a final check before moving forward (820). This permits opportunity for changes if required (822). The auditor collects all inputs from the teams and reviews them. This review either confirms the data as it is or modifies the data. In the event that data has been modified, the auditor must discuss the modifications to ensure an accurate understanding or determine if the modification is required. If modifications are required, the auditor formally updates the data based on the modifications suggested by the team and the validation of the modifications, and makes copies and distributes copies to the team (824). The auditor then selects the element or elements for the audit (826). The suggested element should be a feature that best exercises as many, if not all, of the features offered in the service to be examined. Several elements may be selected to ensure that all aspects of the service are exercised. The auditor then prepares for a review with management (828), which is intended to inform and gain their concurrence. Management then reviews the audit plan and determines whether to proceed with the audit as planned (830). If management does not concur with the audit plan, the auditor restarts the Prepare for Audit sub-process (832). Otherwise, the auditor sends a second audit notice to the teams (834).

Figure 9:
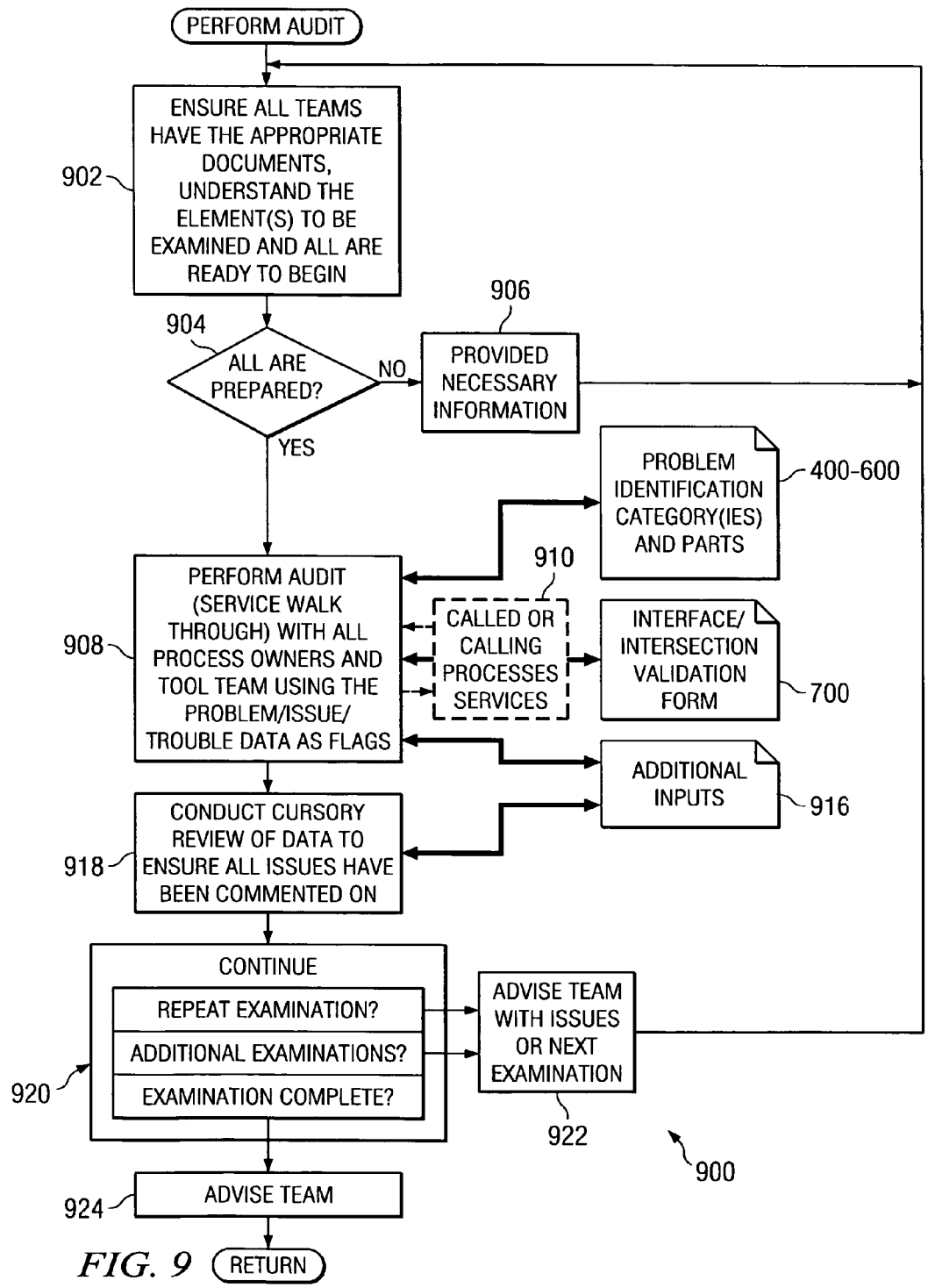
FIG. 9 is a flowchart of the Perform Audit sub-process.

FIG. 9 illustrates the Perform Audit sub-process (900) in detail. The auditor begins the sub-process by verifying that all team members have the most up-to-date documents to be used in the audit (902). The auditor also ensures that all team members know the objectives and the elements to be used to track and monitor the audit (904). The auditor provides missing information, if necessary (906), and then proceeds with the audit walk-through. In the audit walk-through, the service is called and the operational process begins (910). As the operational process continues, the auditor uses problem identification forms 400-600, interface/intersection form 700, and the audit questionnaire 916 to evaluate each step of the operational process. The auditor also should note technology intersections. Once all audit walk-throughs are complete, the auditor conducts a cursory review of data to ensure that all issues have been commented on (918). After concluding the cursory review, the auditor and the team determine if the examination is complete and the data is sufficient to move forward (920). If the auditor and the team determine that the examination is incomplete, the auditor restarts the Perform Audit sub-process (922). Otherwise, the auditor informs the team that the audit is complete (924).

Figure 10:
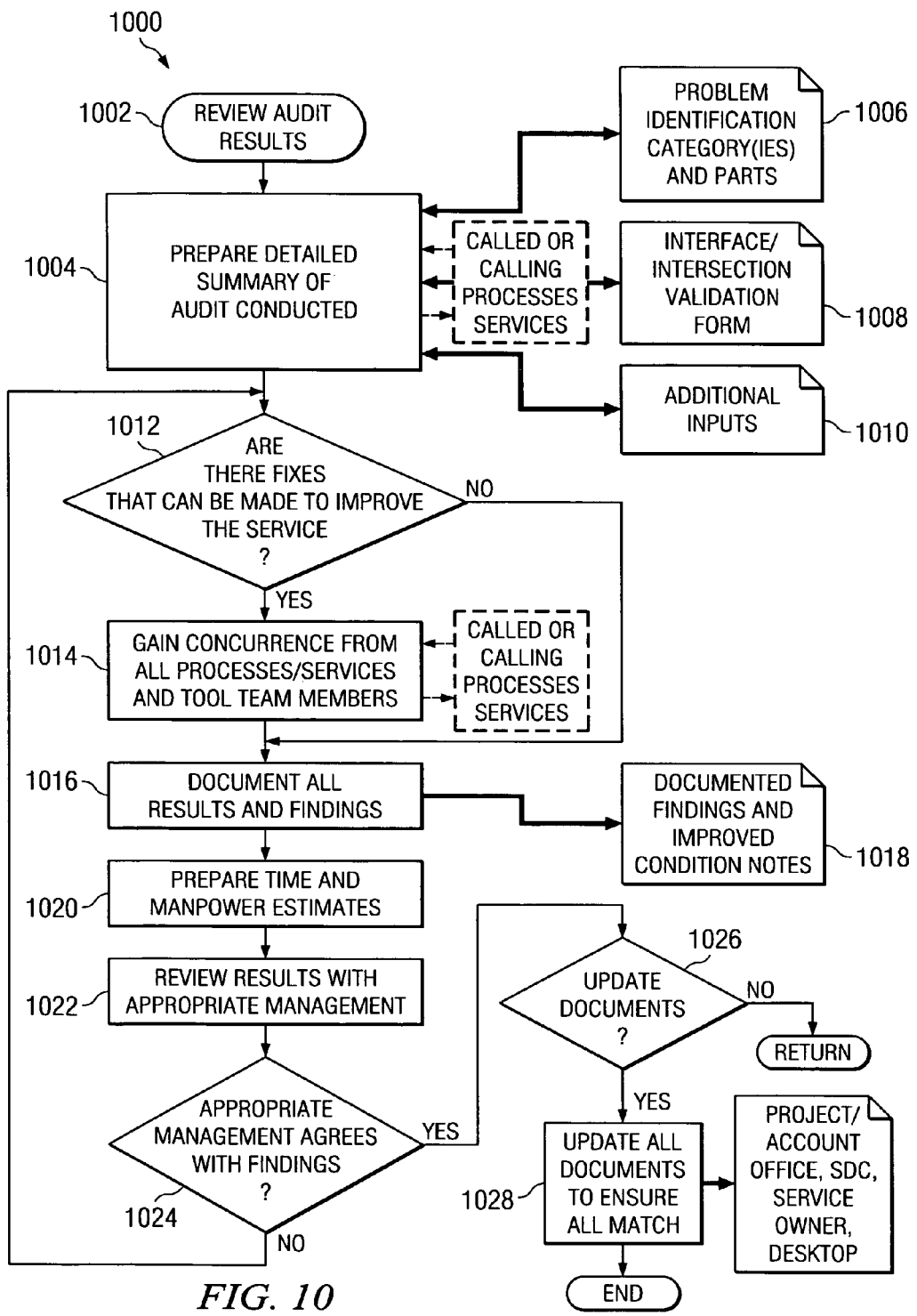
FIG. 10 is a flowchart of the Review & Record sub-process.

FIG. 10 illustrates the sub-process for reviewing audit results, preparing findings, and presenting findings (1000). The objective of this sub-process is to organize the audit results and findings into a meaningful format that will support the development of an action plan. First, the auditor and the team review all of the data generated (1004). This data includes problem identification forms 400-600, interface/intersection validation form 700, and all other documents 1010 used to review the audit. This information includes, but is not limited to, process charts, procedures, policy documents, etc. The information is formatted so that it provides clear indicators of successful and unsuccessful points of execution. The team then must determine if corrective action can improve the service (1012). If the team determines that corrective action is proper, the team must gain concurrence from the auditor and a commitment to take the corrective action (1014). The team then documents the results and findings, and makes a recommendation (1016). If the results and findings do not suggest a good plan of action or provide a timeframe for development and implementation, the documentation must reflect this (1018). The auditor prepares an estimate of the time and manpower that will be required to take the corrective action (1020). The estimate should consider, at a minimum, the manpower and time for planning and development, implementation, and monitoring. The auditor and team next present the findings to management (1022). This step assists in the validation of the effort and also gains management support for the next steps. If management disagrees with the findings, the auditor may restart this sub-process (1024), or management may instruct the team to update the documentation (1026) to ensure that all are consistent and end the effort (1028).

Figure 11:
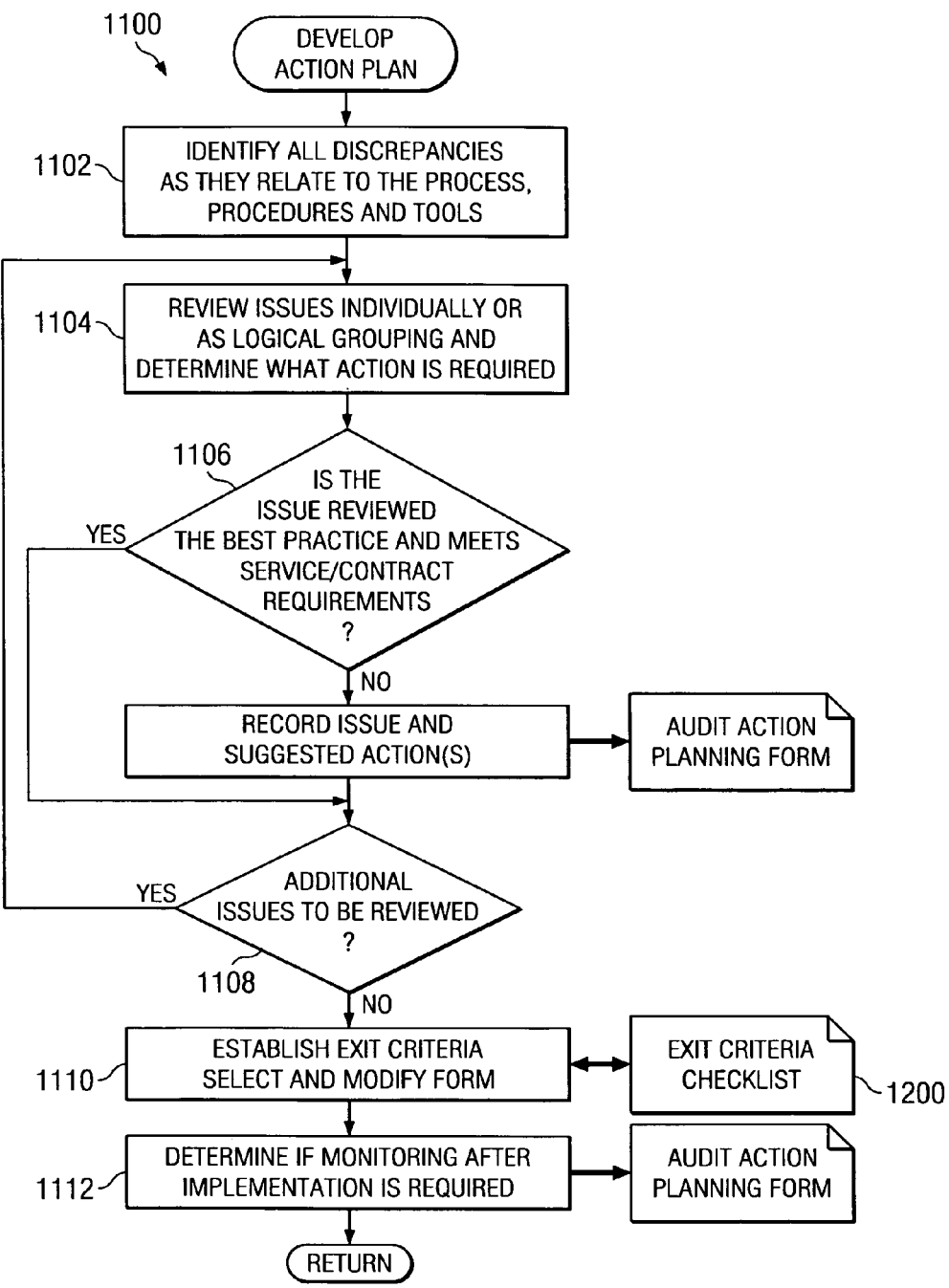
FIG. 11 is a flowchart of the Action Plan Development sub-process.

FIG. 11 illustrates the Action Plan Development sub-process (1100). In this sub-process, the team first gathers all data collected during the audit and uses this data to examine each of the components of the service. The team identifies all discrepancies as they relate to the process, procedures, and tools (1102). Next, the team reviews each issue individually or as a logical grouping, and determines what action is required (1104). The team then modifies the process, procedures, tools, and information as required. Changes to the tools should be performed in such a manner that normal production is not affected (1106). The team next begins an end-to-end walk-through of the service to test the corrective action. If additional issues need to be reviewed (1108), this sub-process may be repeated as indicated in FIG. 11. The team then establishes exit criteria and selects a model for demonstrating that the service has been corrected (1110). An exemplary exit criteria worksheet is provided in FIG. 12. Finally, the team must agree if monitoring is required and, if so, the length of time that monitoring is to occur (1112).

Figure 13:
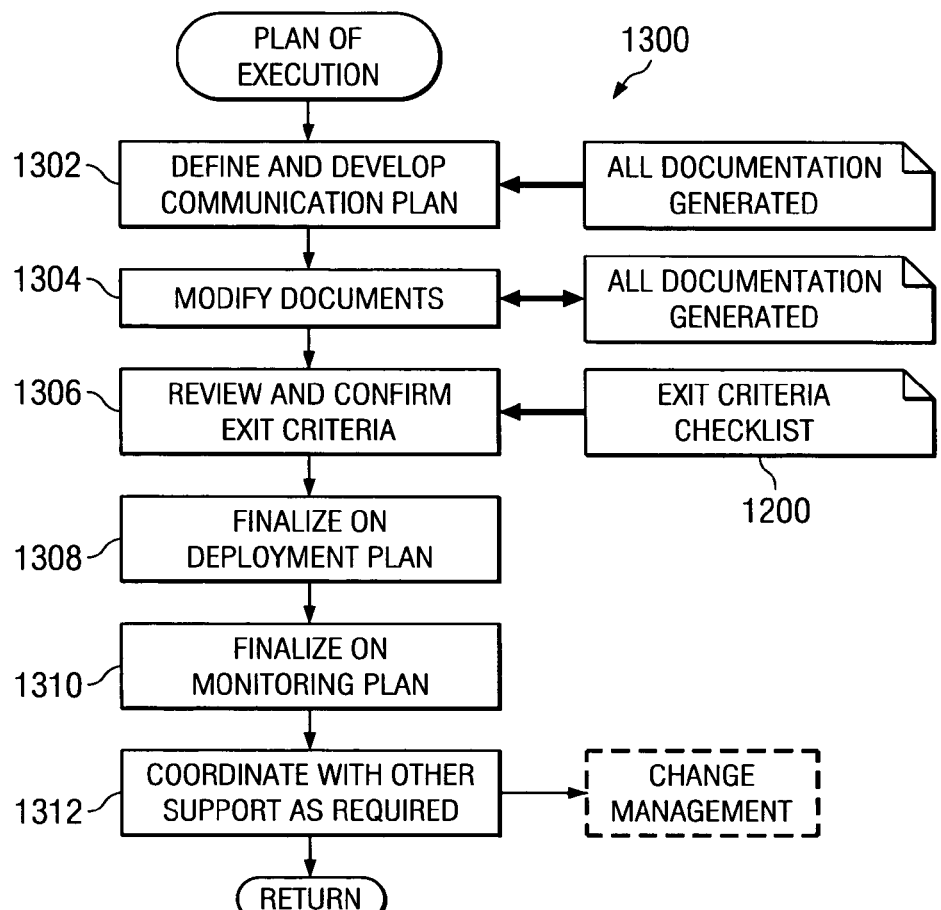
FIG. 13 is a flowchart of the Execution Plan Development sub-process.

FIG. 13 illustrates the Execution Plan Development sub-process (1300). This sub-process updates the necessary documents, organizes all of the components, and sets in place the plan for deploying the solution. The team first develops a Communication Plan (1302). To develop a communication plan, the team reviews all entities that will be impacted by the release of the solution. From this information, the team creates the appropriate dialogue, which discusses the solution, what it includes, benefits, and when it will be released. The team then makes the final modifications and updates to the documents (1304). This includes policy notations on the process flows and validation of the call and answers requirements in the flow, as well as the technology intersections and validation of the interface. Measurements are noted and the means for creating management reports are in place. Considerations for escalation requirements and procedures also are updated and modified. Exit criteria are then reviewed and confirmed (1306).

Figure 14:
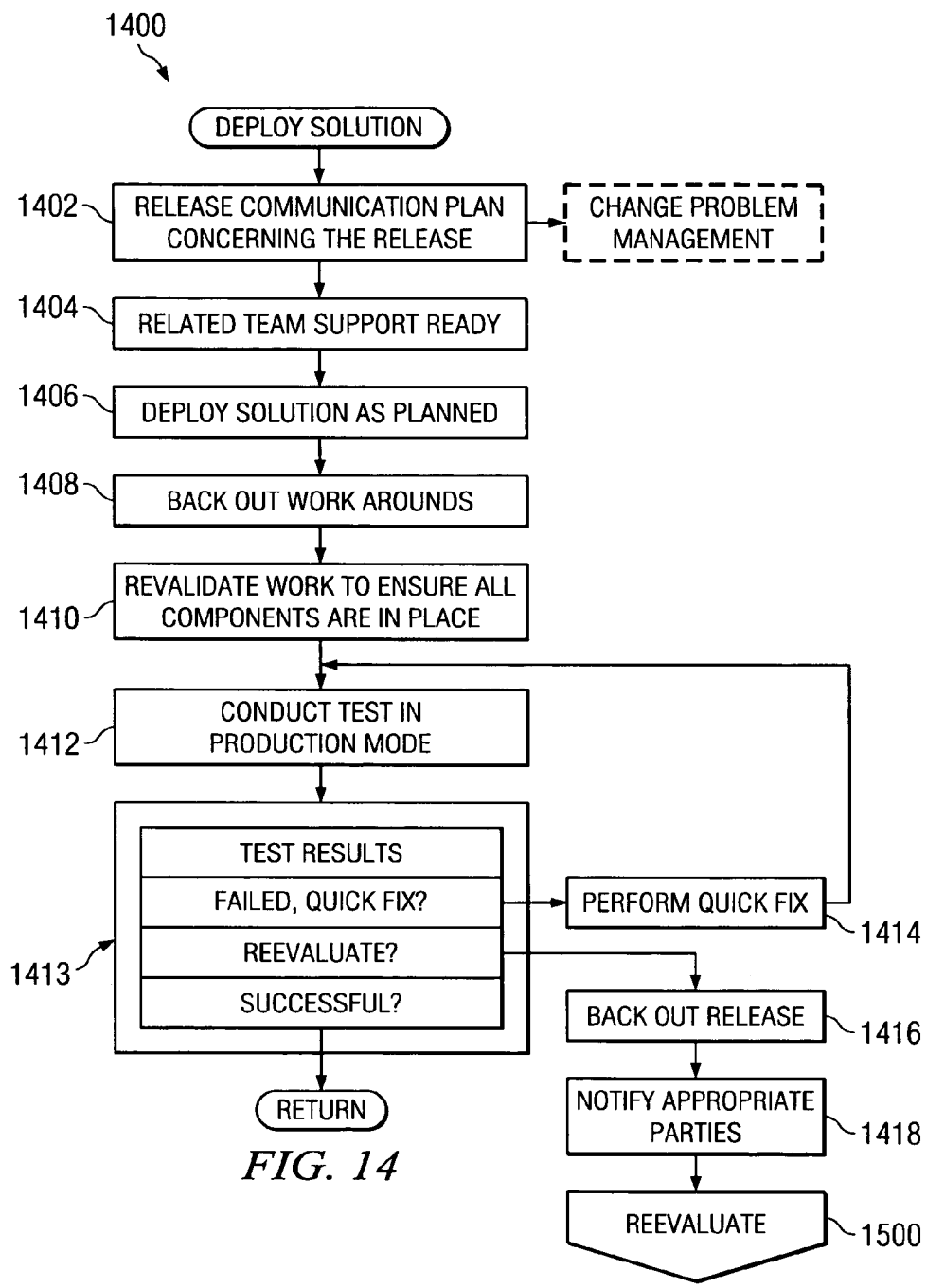
FIG. 14 is a flowchart of the Deploy Solution sub-process.

With the Action Plan and the Execution Plan in place, the team then deploys the corrective action in the production environment (1400). This sub-process is illustrated in FIG. 14. The team first releases the Communication Plan to all parties (1402). The auditor then contacts all parties to ensure that the solution is ready to be deployed (1404). Each team member then deploys the solution according to the Execution Plan (1406). The auditor ensures that the process documents are in place, contacts the technology group and ensures that the tools are in place and ready for use, and checks with the delivery team to ensure that the procedures are in place and ready for use. If "work-arounds" are implemented during the deployment process, these items should be backed out and kept ready in case the solution fails (1408). The team then revalidates the work to ensure that all components are in place (1410). This is the last check after the work-arounds have been removed. The solution should now be in place, and test scenarios should be exercised to ensure that the solution is functional in production (1412). The test results should reflect the success of the deployment and of the solution (1413). If one or more of the tests fail, the team should determine if a quick fix can be implemented, or if the solution must be re-evaluated. If a quick fix is feasible, the team implements the quick fix and runs the test scenarios again (1414). If there is no feasible quick fix, the team backs out the release (1416), notifies the appropriate parties (1418), and re-evaluates the effort (see Reevaluate sub-process 1500, below). If the tests are successful, the system is ready for customer use.

The Reevaluate sub-process (1500), illustrated in FIG. 15, allows the team to review work and present findings to the appropriate management if the solution fails to perform properly in the production environment. Based on the release, the team organizes the items that failed or items, data, or elements that caused the deployment to fail (1502). The team then reviews each item in detail and defines the work required to update or correct the issues (1504). The auditor next gathers all of the information, records the information, and suggests a new plan of action based upon the team input (1506). The team then prepares time and manpower estimates based upon the new plan of action (1508). The auditor then organizes and formalizes the new Action Plan (1510) and estimates, reviews the information with the team (1512-1516), and presents the information to management to gain concurrence or determine if additional information is required (1520). If management requests additional information, the team again reviews the issues and defines the work required to update or correct the issues (1504). Management then decides whether or not to move forward with the effort (1522), and optionally, may provide special instructions (1524). If management provides additional instructions, the auditor gathers any information relevant to the instructions and distributes the information to the team (1526). If management decides not to proceed, the team ensures that the service is performing as it was performing prior to the work, and the team is released from any further responsibilities (1528).

Figures 16A, 16B:
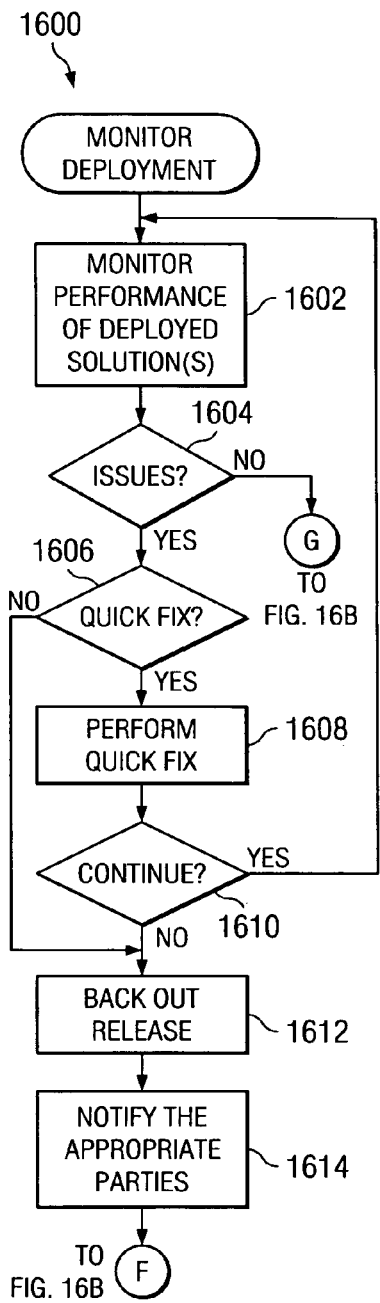
FIGS. 16A-16B is a flowchart of the Monitor Deployment sub-process.

After the solution is deployed, the service provider monitors the operational process to ensure that it is performing as expected (1602), as illustrated in FIG. 16. If monitoring reveals unexpected performance or other issue (1604), the team examines the conditions and determines if a quick fix can be made to correct the issue (1606). If the team has determined that a quick fix is feasible, the team implements the quick fix and updates all documentation to reflect the changes necessitated by the quick fix (1608). The team then determines if the quick fix is working as intended. If the quick fix is working as intended, the team continues the monitoring process until all exit criteria have been satisfied (1610). If the quick fix is not working as intended, the team must reverse the corrective action and restore the original service (1612). The auditor notifies the appropriate parties (1614) that an issue caused the corrective action to fail, and the team begins to re-evaluate the problem (1500), as described above with reference to FIG. 15. When the team determines that the corrective action satisfies all exit criteria (1618) established in the Action Plan, the team completes the exit criteria worksheets and records lessons learned (1620). The auditor then updates all dates, version numbers, etc. in all documents (1622), notifies the appropriate parties that work is complete (1624), and releases the team from the effort (1626).

Figure 17:
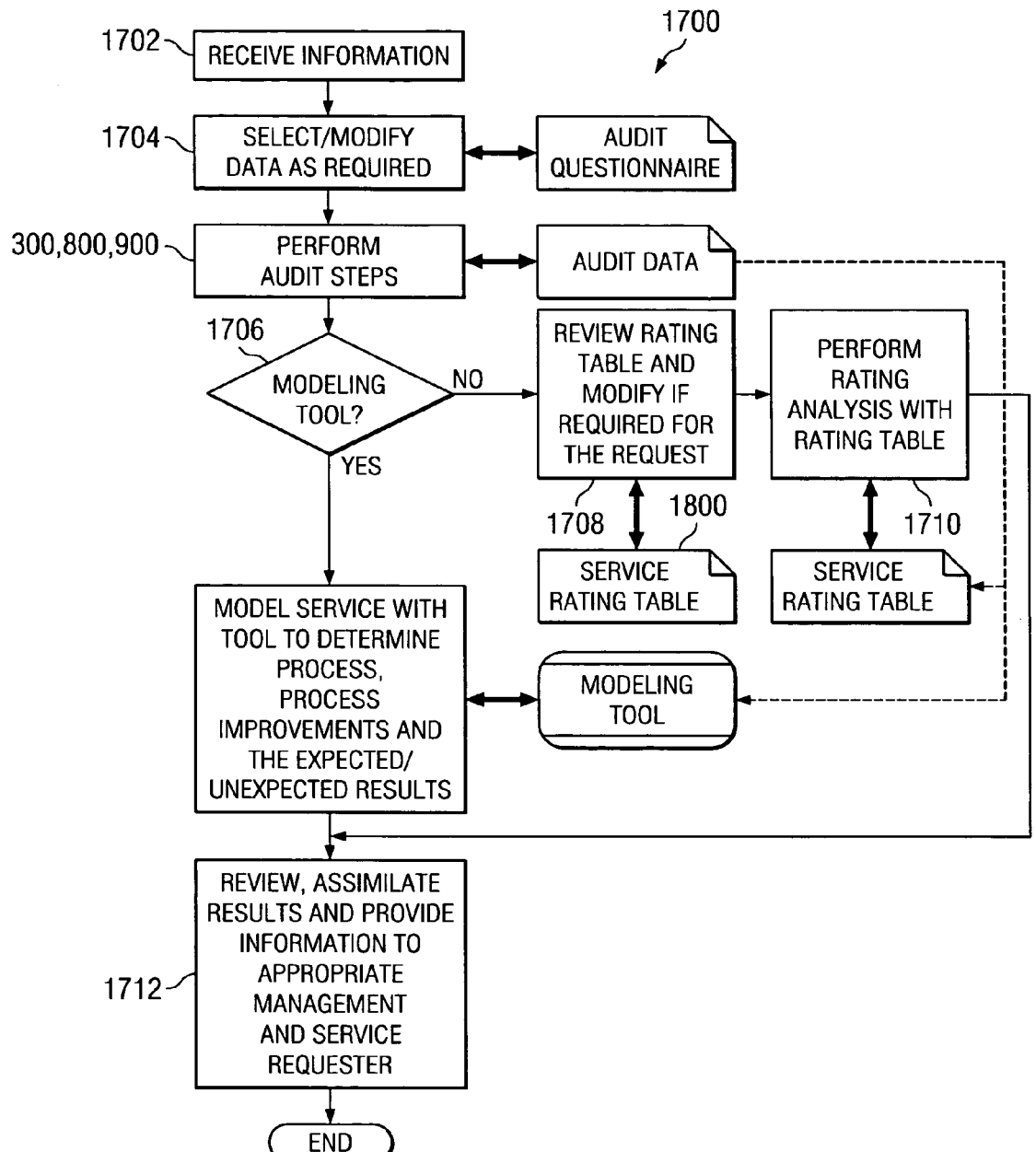
FIG. 17 is a flowchart of the Prospective Account Evaluation process.

As noted above, the inventive methodology also encompasses the evaluation of prospective services. FIG. 17 illustrates the application of the methodology to such a prospective service. This application of the methodology is referred to here as the "prospective account evaluation" methodology (1700). The object of the prospective account evaluation methodology is to provide assurance to the service provider that a service can be delivered in such a manner that it meets or exceeds customer expectations while producing a profit. In the context of prospective account evaluation methodology (1700), the term "customer" refers to the prospective end-user of the service or services that the service provider is offering. A "service requester" is a liaison between the customer and the service provider. The service requester accepts requests from the customer and coordinates the prospective account evaluation with the service provider. The prospective account evaluation begins when the service requester receives a request to evaluate a new account or a single service (1702). The service requester gathers relevant information and formats it as required for the service provider to review. This information should describe all elements of the service and the desired output. Other information also may describe the customer's current technology, key contacts within the customer's organization, desired schedules, etc. The service provider then receives the request and reviews the information to ensure that the data is adequate to support the evaluation. The service provider also may request the service requester to provide additional information before continuing. The service provider then prepares an audit questionnaire (1704). The service provider then proceeds with steps 300, 800, & 900, described above. The output of this step provides insight into other requirements, the projected time to perform, tools, and interactions with other services. The service provider may have an existing tool for modeling a service or set of services (1706). If the service provider does not have such a tool, then the service provider should prepare a rating table (1708). An exemplary rating table is provided in FIG. 18. This rating table is a template and should be modified to meet the needs of the prospective account. The service provider then populates the rating table with data from the audit (1710) and reviews the rating with appropriate management (1712). As used in the exemplary rating table, a service rating of "low risk" indicates that the service requires a simple design with minimal impact to existing technology infrastructure, and that appropriate levels of customer satisfaction could be achieved with an adequate profit margin. A "medium risk" rating suggests that the service is within the known customer cost and satisfaction tolerance of the service provider, and that the service should produce a profit, but with greater impact on existing infrastructure. A "high risk" rating suggests that the prospective account may not be in the best interests of the customer or the service provider. Ultimately, management is responsible for considering the service rating in light of all other factors and for deciding to enter into a contractual relationship for the delivery of the prospective service. If management decides to enter into such a relationship, many aspects of problem analysis methodology (200) described above may be applied develop operational processes that support delivery of the prospective service. In particular, the service provider may develop an action plan (1100), develop a plan of execution (1300), deploy the processes or service in accordance with the plan of execution (1400), monitor the deployed processes or services (1600), and record lessons learned (1620).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for analyzing a problem in a distributed processing business system used to provide a service, the method comprising:

identifying the problem, comprising
      completing a problem identification form to evaluate the service,
      identifying a core process from the problem identification form, and
      completing an interface form to evaluate the interface between the core process and associated services; wherein completing the problem identification form comprises completing a first worksheet to evaluate project office data associated with the service, completing a second worksheet to evaluate processes and procedures associated with the service, and completing a third worksheet to evaluate the technology associated with the service;

preparing for an audit, comprising
      gathering documents associated with the service, preparing an audit questionnaire, gaining approval of the audit questionnaire and the identified core process from management, and sending audit notices to a delivery team;

performing the audit, comprising
      executing the core process and evaluating the core process in accordance with the problem identification form, the interface form, and the audit questionnaire;

reviewing the audit and recording a result of the audit;

using the result of the audit, developing an action plan, comprising
      identifying discrepancies between the core process and associated procedures and tools, resolving the discrepancies, and establishing exit criteria;

using the action plan, developing an execution plan;

using the execution plan, deploying a solution, comprising
      releasing a communication plan, verifying that the solution is installed, testing the solution in a production environment, performing a quick fix if the testing fails and the quick fix is available, and restoring the original service if the testing fails and a quick fix is unavailable;

monitoring the deployed solution, comprising
      identifying an issue, performing a quick fix if the quick fix is available for the issue, and restoring the original process if the quick fix is unavailable; and recording a lesson learned.

* * * * *